United States Patent [19]

Martin

[11] 4,418,786
[45] Dec. 6, 1983

[54] BOTTOM DIAPHRAGM FOR TRANSPORTER FOR A SEISMIC ENERGY SOURCE

[75] Inventor: Philip N. Martin, Tulsa, Okla.

[73] Assignee: Mapco, Inc., Tulsa, Okla.

[21] Appl. No.: 272,772

[22] Filed: Jun. 11, 1981

Related U.S. Application Data

[63] Continuation-in-part of Ser. No. 188,370, Sep. 18, 1980, Pat. No. 4,334,591, which is a continuation-in-part of Ser. No. 963,982, Nov. 27, 1978, Pat. No. 4,223,759.

[51] Int. Cl.³ .............................................. G01V 1/104
[52] U.S. Cl. .................................. 181/116; 89/40 L; 181/114; 181/401
[58] Field of Search ............... 181/114, 115, 116, 117, 181/119, 121, 401; 367/145; 73/167; 89/40 L

[56] References Cited

U.S. PATENT DOCUMENTS

| | | | |
|---|---|---|---|
| 2,812,660 | 11/1957 | Marden et al. | 73/167 |
| 2,818,729 | 1/1958 | Ferguson | 73/167 |
| 4,108,271 | 8/1978 | Chelminski | 181/117 X |
| 4,223,759 | 9/1980 | Martin | 181/114 X |
| 4,334,591 | 6/1982 | Martin | 181/401 X |
| 4,354,572 | 10/1982 | Martin | 181/401 X |
| 4,359,131 | 11/1982 | Martin | 181/401 X |

Primary Examiner—Maynard R. Wilbur
Assistant Examiner—K. R. Kaiser
Attorney, Agent, or Firm—Head, Johnson & Stevenson

[57] ABSTRACT

An improved portable seismic energy source including a base member having cylindrical sidewalls and an open lower end for resting on the earth's surface, a horizontal baseplate secured to the base member upper end, the baseplate having a central opening therein, a gun mounted on the horizontal baseplate for firing a projectile through the opening therein to impact the earth's surface and generate a seismic signal, a spatter plate mounted to the base member such as by means of a vertical cylinder secured to the lower surface of the baseplate with the lower end of the cylinder being affixed to the spatter plate, the spatter plate having an opening therein in register with the cylinder so that a projectile fired passes through the opening, the spatter plate being positioned above the earth's surface, and a flexible diaphragm secured at its periphery to the lower circumferential surface of the base member and having a central opening therein, the diaphragm being stretched over the top of the spatter plate, the spatter plate and diaphragm serving to intercept gas, liquids, and solid objects which are ejected when a projectile is fired to generate a seismic signal.

7 Claims, 4 Drawing Figures

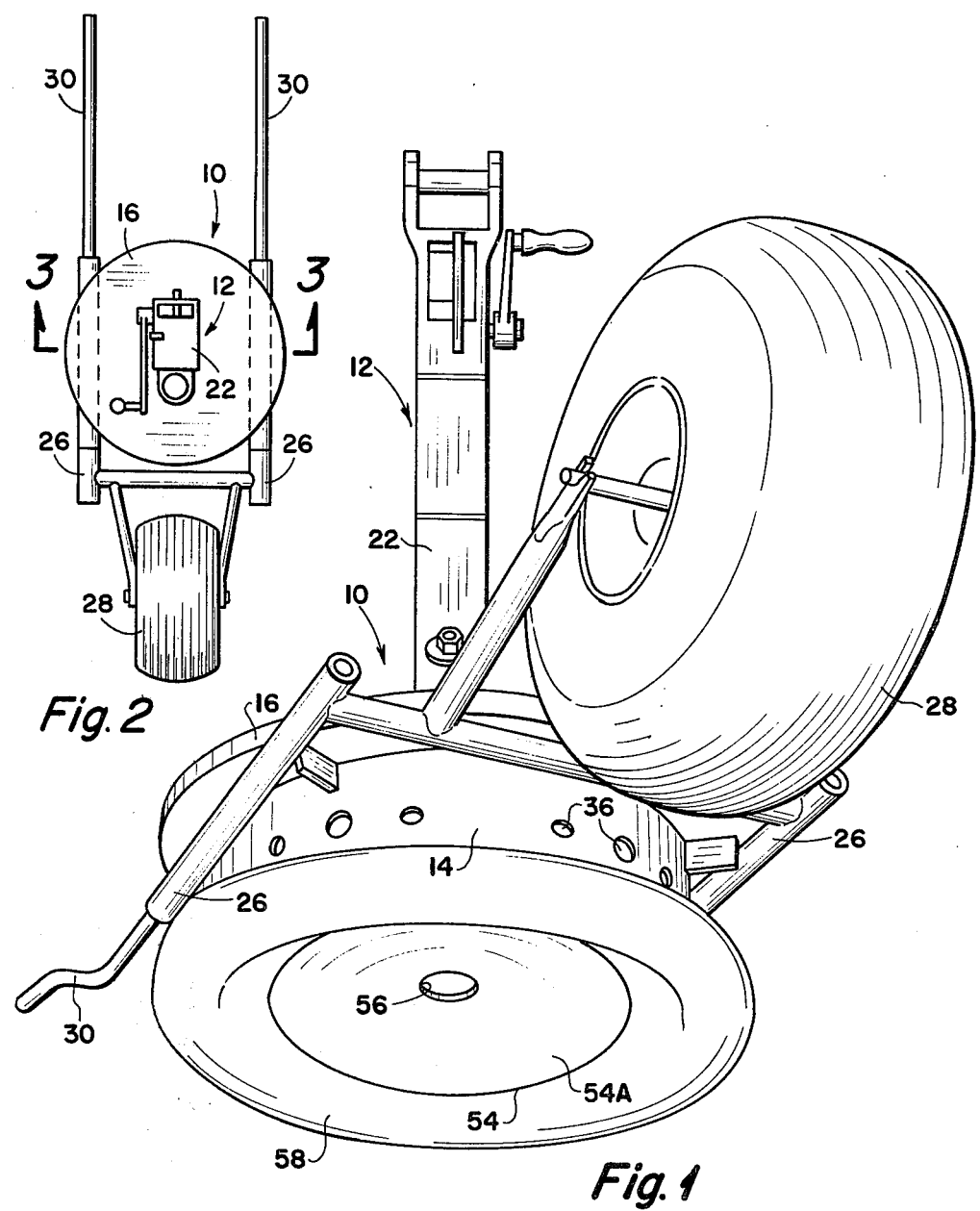

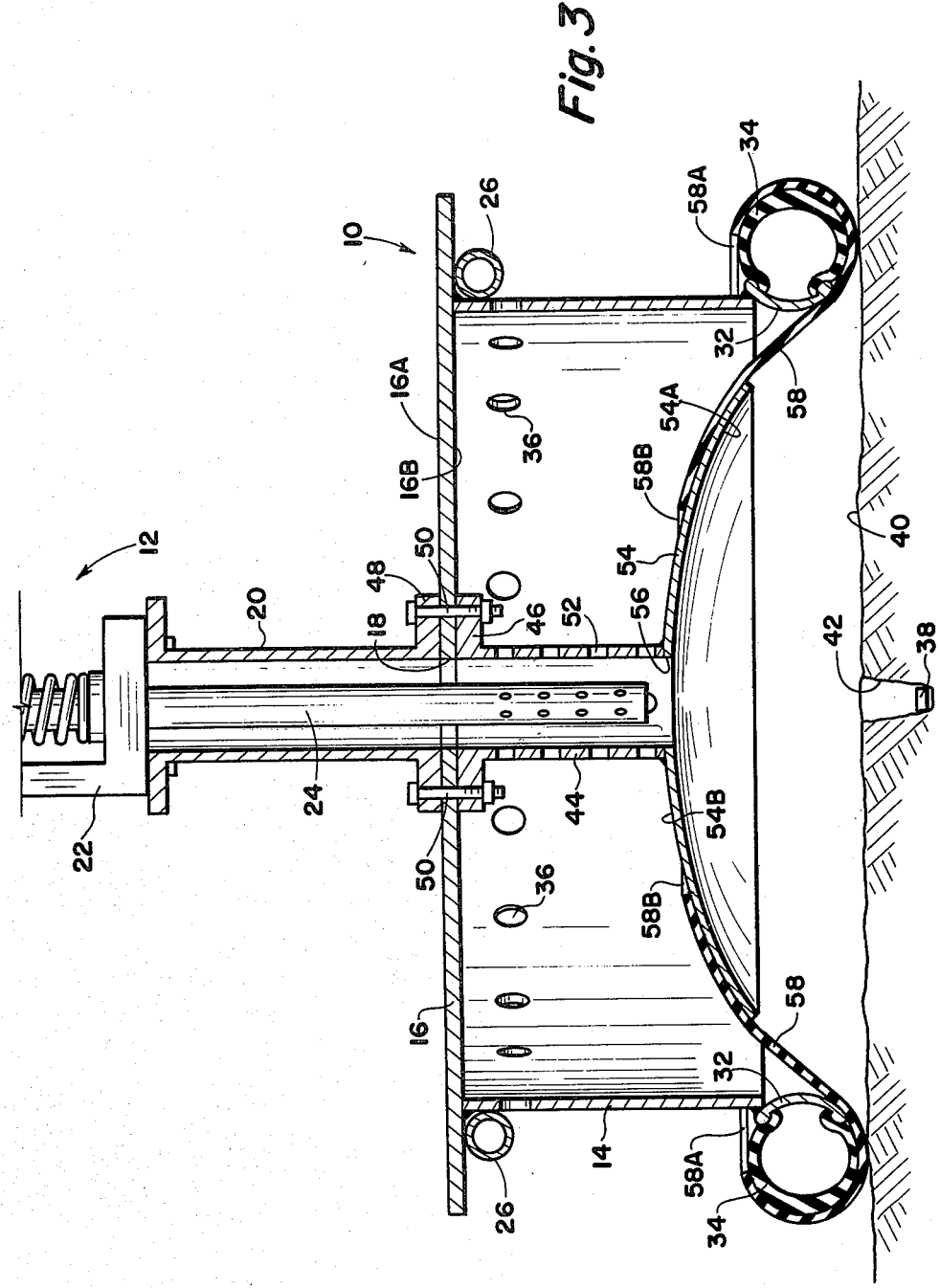

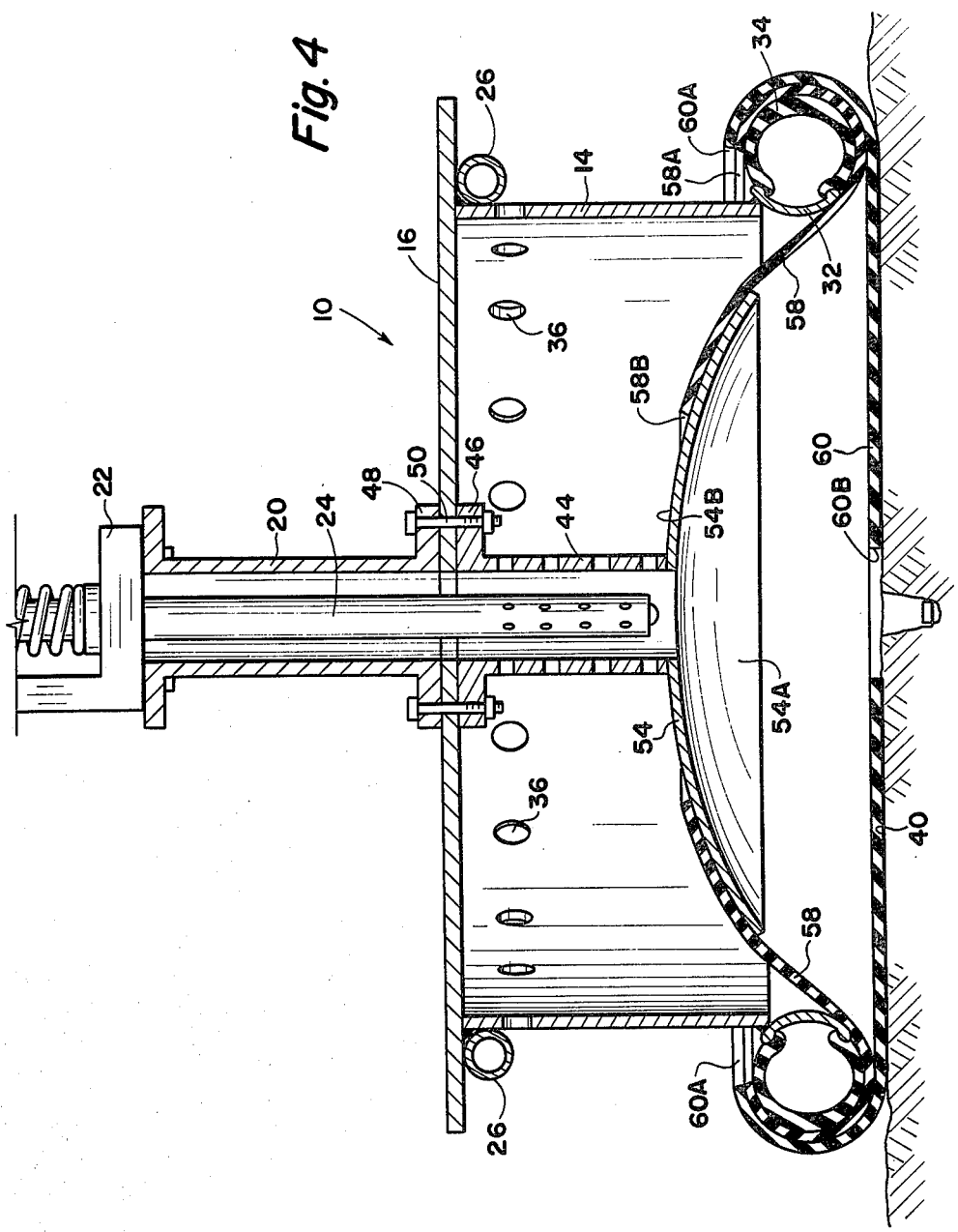

BOTTOM DIAPHRAGM FOR TRANSPORTER FOR A SEISMIC ENERGY SOURCE

CROSS-REFERENCE TO RELATED APPLICATION

This is a continuation-in-part of application Ser. No. 188,370 filed Sept. 18, 1980, entitled "Transporter For Low Energy Seismic Source now U.S. Pat. No. 4,334,591" which in turn is a continuation-in-part of application Ser. No. 963,982, entitled: "Low Energy Source For Seismic Operation", filed Nov. 27, 1978 now U.S. Pat. No. 4,223,759.

BACKGROUND OF THE INVENTION

1. Field of the Invention

This invention relates to apparatus for generating seismic signals useful for geophysical mapping and exploration. Seismic signals are generated by means of a projectile fired from a gun. The gun is mounted on a base which is, in the usual form, a cylindrical member with sidewalls and a top plate. Means are provided for moving the base about on the surface of the earth with the base supported on its lower end when a projectile is fired. The invention is directed towards improvements in the mounting of a spatter plate and diaphragm to more effectively intercept gas, liquids, and solid objects which are ejected when a projectile is fired to generate a seismic signal.

2. Description of the Prior Art

A brief discussion of the prior art is set out in the parent application of which this is a continuation-in-part. The concept to which this invention is relevant is that of providing a portable seismic energy source which generates a seismic signal by means of a gun mounted to fire a projectile into the earth. While the gun may be supported in a variety of ways, a method found to be successful is the provision of a base on which the gun is supported with a wheeled arrangement so that it can be moved about on the surface of the earth. When a seismic signal is to be generated the base is supported directly on the surface of the earth. When a projectile is fired the gas of the explosion must be vented. In addition, liquids and solid objects are ejected by the force of impact of the projectile and by the force of the firing gases. In order to prevent injury to operators or bystanders, it is important that the gas, liquid, and solid objects be intercepted.

It has been discovered that the safety of the operation of a portable seismic source is improved by the use of a flexible diaphragm in conjunction with the base and, this is the subject matter of Application Ser. No. 188,370 above referenced. It has been further discovered that improved diaphragm performance and extended life of the diaphragm can be obtained by an arrangement wherein a spatter plate of metal is positioned within the base and spaced above the ground to receive the impact of a majority of the liquids, gases and solids which are ejected as a projectile impacts the earth. The diaphragm can be further employed to intercept other objects which do not strike the spatter plate while at the same time permitting the upward passage of gases to equalize pressure within the base by mounting the diaphragm around the periphery of the base and over the top of the spatter plate. It is this arrangement to which the present invention is directed.

SUMMARY OF THE INVENTION

An improved portable seismic energy source is provided by this invention. The device which will be described in detail subsequently is primarily adapted for use for transportation by an individual over the surface of the earth from point-to-point as necessary to provide seismic energy signals. In the most common embodiment of the invention it is somewhat in the nature of a wheelbarrow, that is, it has a wheel for rolling on the ground and handlebars so that it can easily be moved from place to place. To generate a seismic signal the device is rested on the ground, and for this purpose a base is provided, typically cylindrical with vertical sidewalls. In the preferred arrangement the base has a pneumatic tire, such as a motorcycle tire, secured to the bottom to engage the ground. This provides a resilient support for the base and helps seal against the escape of gases, liquids, or solid objects. The base has a baseplate across the top with an opening in the middle of it. Supported on the baseplate is a large bore gun, such as an industrial type 8-gauge gun capable of firing a lead slug. The gun is vertically mounted and fired downwardly through the base so that the slug engages the earth to generate the seismic signal.

The function of this invention is to provide improved means of:

(a) Preventing ground spatter from blowing up into the base chamber and accumulating in quantities that add excessive weight that hinder ease of movement of the device;

(b) More effectively containing muzzle blast gases in the upper portion of the base chamber for venting;

(c) More effectively muffling noise of the muzzle blast; and (d) Reduce gas, liquid and solid ejections from under the base perimeter.

For this purpose, affixed to the baseplate lower surface and extending radially downwardly in the base is a cylindrical member. Attached to the end of the cylindrical member is a spatter plate of exterior diameter less than the interior diameter of the base. The spatter plate is spaced above the ground and in the illustrated and preferred arrangement is of a concave lower configuration and convex upper configuration. The slug fired from the gun passes through the cylindrical member and the opening in the spatter plate to engage the surface of the earth directly below these elements. To further prevent the escape of potentially dangerous objects, a flexible diaphragm is included which is attached to the lower perimeter of the base; and when a pneumatic tire is used, the diaphragm extends over the perimeter of the tire. The diaphragm has an opening in the middle thereof and extends upwardly and over the spatter plate. Gas generated when a projectile is fired can escape by forcing the elastomeric diaphragm upwardly from engagement with the top surface of the spatter plate; but at the same time, physical objects and liquids are impeded so that they are restrained from passing outwardly from the interior of the baseplate. An alternate embodiment includes the use of two diaphragms. In addition to the first one mentioned, a second one is secured to the lower circumferential periphery of the base. When a pneumatic tire is used, the second diaphragm is secured around the pneumatic tire and extends in a horizontal plane to engage the earth beneath the spatter plate. The second diaphragm has an opening therein through which the slug passes as it is fired. The use of this second diaphragm further impedes the possibility of ejection of objects which could be harmful to the operator or bystanders and helps muffle the noise of the blast as a projectile is fired.

DESCRIPTION OF THE DRAWINGS

FIG. 1 is an isometric view taken from the forward and bottom end of an apparatus for firing projectiles to a source of seismic energy.

FIG. 2 is a top view of the apparatus as shown in FIG. 1.

FIG. 3 is a cross-sectional view taken along the line 3—3 of FIG. 2 and showing details of the arrangement of the base structure and the diaphragm used to intercept liquids, gases, and solid objects when a projectile is fired.

FIG. 4 is a cross-sectional view as in FIG. 3 but showing an alternate embodiment of the invention in which a second diaphragm is employed for increased safety and for further muffling of the sound generated when a projectile is fired.

DESCRIPTION OF THE PREFERRED EMBODIMENTS

Referring to FIGS. 1, 2, and 3, an embodiment of the invention is illustrated including a base generally indicated by the numeral 10 which supports a projectile firing gun 12. The base includes a cylindrical sidewall 14. Affixed to the upper end of sidewall 14 is a top plate 16 having an upper surface 16A and lower surface 16B, and having an opening 18 therein. Secured to the top plate upper surface 16A and in line with opening 18 is a tubular gun mount 20 which has, attached to the upper end thereof, the frame portion 22 of gun 12.

Extending downwardly from gun 12 is the muzzle or barrel 24 which is received within the tubular gun mount 20 and extends through opening 18 in the top plate.

To provide means for easily transporting the seismic energy generating source over the earth, a tubular frame 26 supports a wheel 28. At the other end handlebars 30 are provided.

The lower end of the cylindrical sidewall 14 of the base is attached to the rim 32 of a wheel of the type commonly used for vehicles, such as a motorcycle wheel. Received on the periphery of the rim is a pneumatic tire 34, such as a motorcycle tire.

The cylindrical base sidewall 14 has openings 36 to provide means for the escape of gas generated when a projectile is fired by gun 12.

To generate a seismic signal, the gun 12 fires a projectile through barrel 14 which passes downwardly through opening 18 in the top plate 16. The projectile 38 engages the surface of the earth 40 and penetrates, forming a hole 42. The force of impact of projectile 38 generates a seismic shock of sufficient magnitude to cause seismic signals to travel radially away from the point of impact. These signals travel downwardly in the earth and are reflected by zones of density change. By the use of geophones (not illustrated) reflected seismic signals are detected and such detected signals provide a record useable to geophysicists in forming conclusions as to the shape and character of the earth substructures.

As previously indicated, a gun mount 20 is secured to the top plate upper surface 16A. Extending downwardly from the top plate lower surface 16B and in alignment with the opening 18, is a cylindrical member 44. Various means may be employed for mounting the member 44 to the top plate 16; however, the illustrated arrangement is preferred in which the member has a flange 46. The gun mount 20 may also be provided with a flange 48 so that the two flanges are secured in aligned relationship on opposite sides of the top plate by means of bolts 50. The cylindrical member 44 is provided with openings 52 to allow the passage of gas therethrough.

Affixed to the lower end of the cylindrical member 44 is a spatter plate 54 having an opening 56 therein which is in alignment with the tubular opening of member 44. The spatter plate 54 is of metal, such as steel, aluminum, or so forth, and is typically secured to the lower end of the tubular member 44 such as by welding. The spatter plate may be planar, that is, flat, or the preferred arrangement is as illustrated wherein the lower surface 54A is concave and the upper surface 54B is convex, in the typical configuration of a plow disc.

The spatter plate serves to intercept rocks, dirt, liquids, and gases which are ejected upwardly from hole 42 when projectile 38 impacts the earth. The spatter plate 54 is positioned centrally within the cylindrical wall 14 of the base and is of diameter less than the interior diameter of the base and is supported above the surface of the earth 40.

To further aid in the interception of gases, liquids, and solid objects which are ejected when a projectile 38 strikes the earth, a flexible diaphragm 58 is employed. The diaphragm is configured so that the outer periphery 58A extends around pneumatic tire 34. A large opening 58B is provided in the center of the diaphragm, the diameter of the opening being less than the exterior diameter of spatter plate 54. The diaphragm is extended upwardly over the top surface 54B of the spatter plate and is in normal engagement with it. When a projectile is fired, escaping gases beneath the spatter plate can pass upwardly between the diaphragm 58 and the spatter plate top surface 54B by resilient displacement of the diaphragm. This serves to permit equalization of gas pressures upon firing a projectile but serves to securely intercept physical material such as rocks, sand, dirt, water, mud, etc. which might be kicked upwardly and outwardly when a projectile impacts the earth. Further, the use of the spatter plate 54 and diaphragm 58 retains mud, dirt, etc. in the lower portion of the structure and prevents such materials from impacting against the interior sidewalls 54 and the bottom surface 16B of the top plate. In this manner, less mud and dirt is caked against the interior of the structure and, therefore, the structure does not become burdened and encumbered with these materials so that the operator can more easily move the device about from one position to another.

FIG. 4 shows an alternate embodiment of the invention. All aspects of it are the same except that a second diaphragm 60 is employed. The outer periphery 60A is stretched over the pneumatic tire 34 and over the outer portion of the first diaphragm. The second diaphragm 60 extends in a plane across the lower peripheral surface of the base 10 and is in contact with the earth's surface 40 when the base is lowered into position for the firing of a projectile. An opening 60B is formed in the second diaphragm 60 through which the projectile passes when it is fired from the gun. The opening 60B may be preformed, and reinforcing may be provided around the opening such as is described in the co-pending parent application above referenced, or the diaphragm 60 may be initially installed without an opening and the first projectile fired through the diaphragm serves to penetrate the diaphragm and form an opening. The preferred arrangement will depend upon the thickness and the type of material of which the diaphragm 60 is composed. If it is of a heavy, tough material and not easily torn by the effect of the blast employed in firing a projectile, then it may be utilized in a manner wherein no opening 60B is provided in advance and the firing of the first projectile is sufficient to form the opening. On the other hand, if the diaphragm 60B is of a thinner, less rugged material and is of the type which would be torn by the high gas pressures generated when the projectile is fired, then the use of a larger diameter opening 60B would be more practical and reinforcing around the opening 60B may be necessary.

The arrangements of the invention including both the embodiment of FIG. 3 and FIG. 4 provides a highly successful method of constructing a base for a low energy seismic source. The arrangement significantly improves the safety of the apparatus by providing means for intercepting gases, liquids, and solids ejected when a projectile is fired and in an arrangement wherein a minimum weight is required so as to preserve the easy portability of the seismic energy source.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed is:

1. An improved portable seismic energy source comprising:
    a base member having sidewalls, a lower end for resting on the earth's surface and a horizontal baseplate secured to the upper end, the base member having an open bottom and an opening in the horizontal baseplate;
    a gun mounted on said horizontal baseplate for firing a projectile through the opening therein to impact the earth's surface and generate a seismic signal;
    a spatter plate having an upper surface and a lower surface and an opening therethrough, the spatter plate having outside dimensions less than said base member and being mounted within said base member and having the lower surface spaced above the base member bottom so that the spatter plate is supported above the earth's surface, the spatter plate having a central opening therein in alignment with said baseplate opening; and
    a diaphragm of flexible material secured to the periphery of said base member lower end, the diaphragm having a central opening therein and the central portion thereof surrounding the opening being received on the upper surface of said spatter plate, the diaphragm and spatter plate serving to intercept gases, liquids and solids ejected when a projectile engages the earth.

2. An improved portable seismic energy source according to claim 1 including:
    a vertical tubular cylinder secured at its upper end to the lower surface of said baseplate, said spatter plate being secured to the cylinder bottom end with the openings in said baseplate and spatter plate being in alignment with the tubular axis of the cylinder.

3. An improved portable seismic energy source according to claim 1 in which said spatter plate has a concave lower surface and convex upper surface.

4. An improved portable seismic energy source according to claim 1 including:
    a horizontal peripheral elastomeric means affixed to said base lower end, said diaphragm being affixed at its periphery to the elastomeric means.

5. An improved portable seismic energy source according to claim 4 wherein said horizontal peripheral elastomeric means is in the form of a pneumatic tire.

6. An improved portable seismic energy source according to claim 1 including:
    a second diaphragm of flexible material secured to the periphery of said base member lower end below said first diaphragm and said spatter plate, the second diaphragm engaging the earth's surface when the base is rested on the earth.

7. An improved portable seismic energy source according to claim 6 in which said second flexible diaphragm has a central opening therein in register with said opening in said horizontal baseplate.

* * * * *